(12) United States Patent  (10) Patent No.: US 7,268,974 B2
Lille  (45) Date of Patent: Sep. 11, 2007

(54) MAGNETIC WRITE HEAD HAVING A NOTCHED YOKE STRUCTURE WITH A TRAILING SHIELD AND METHOD OF MAKING THE SAME

(75) Inventor: Jeffrey Scott Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 427 days.

(21) Appl. No.: 10/836,998

(22) Filed: Apr. 30, 2004

(65) Prior Publication Data

US 2005/0243464 A1  Nov. 3, 2005

(51) Int. Cl.
G11B 5/31 (2006.01)
G11B 5/187 (2006.01)
G11B 5/127 (2006.01)

(52) U.S. Cl. ........................ 360/126; 360/122
(58) Field of Classification Search ................ 360/125, 360/126, 122
See application file for complete search history.

(56) References Cited

U.S. PATENT DOCUMENTS

| 4,656,546 | A | | 4/1987 | Mallory |
| 4,740,855 | A | | 4/1988 | Diepers et al. |
| 5,075,956 | A | | 12/1991 | Das |
| 5,726,841 | A | * | 3/1998 | Tong et al. ................. 360/122 |
| 5,805,390 | A | | 9/1998 | Takeura et al. |
| 5,920,449 | A | * | 7/1999 | Tagawa ...................... 360/122 |
| 6,067,220 | A | | 5/2000 | Ahmann et al. |
| 6,267,903 | B1 | | 7/2001 | Watanuki |
| 6,415,500 | B1 | | 7/2002 | Han et al. |
| 6,430,010 | B1 | * | 8/2002 | Murdock .................... 360/319 |
| 6,470,566 | B2 | | 10/2002 | Hsiao |
| 6,631,056 | B1 | | 10/2003 | Asatani et al. |
| 7,009,812 | B2 | * | 3/2006 | Hsu et al. ................... 360/126 |
| 7,057,853 | B2 | * | 6/2006 | Okada et al. ............... 360/126 |
| 2002/0066177 | A1 | | 6/2002 | Takeda et al. |
| 2003/0184920 | A1 | | 10/2003 | Jarrett et al. |
| 2003/0210501 | A1 | | 11/2003 | Voldman |
| 2005/0068671 | A1 | * | 3/2005 | Hsu et al. ................... 360/125 |
| 2005/0128637 | A1 | * | 6/2005 | Johnston et al. ........... 360/125 |

FOREIGN PATENT DOCUMENTS

| EP | 376459 | A2 | * | 7/1990 |
| JP | 59142717 | | | 8/1984 |
| JP | 60163221 | A | * | 8/1985 |
| JP | 61277710 | | | 8/1987 |

(Continued)

*Primary Examiner*—William J Klimowicz
(74) *Attorney, Agent, or Firm*—John J. Oskorep, Esq.; Rambod Nader

(57) ABSTRACT

A magnetic write head for a data storage device includes a pole piece layer; a pole tip structure formed over the pole piece layer; a trailing shield formed at least in part along an air bearing surface (ABS) of the magnetic head adjacent the pole tip structure; a non-magnetic gap layer formed between the trailing shield and the pole tip structure; a yoke structure formed over at least part of the trailing shield; and a notch formed in the yoke structure adjacent the pole tip structure. Advantageously, the notch reduces magnetic flux otherwise drawn by the yoke structure in the region directly adjacent the pole tip structure. A method of making the magnetic head is also disclosed.

30 Claims, 7 Drawing Sheets

FOREIGN PATENT DOCUMENTS

| | | | |
|---|---|---|---|
| JP | 6381617 | 4/1988 |
| JP | 63195818 | 8/1988 |
| JP | 6448217 | 2/1989 |
| JP | 210509 | 1/1990 |
| JP | 6180810 | 6/1994 |
| JP | 06180810 A * | 6/1994 |
| JP | 06301920 A * | 10/1994 |
| JP | 7225912 | 8/1995 |
| JP | 6381616 | 4/1998 |
| JP | 11086210 A * | 3/1999 |
| JP | 11120510 A * | 4/1999 |
| JP | 2003016609 A * | 1/2003 |

* cited by examiner

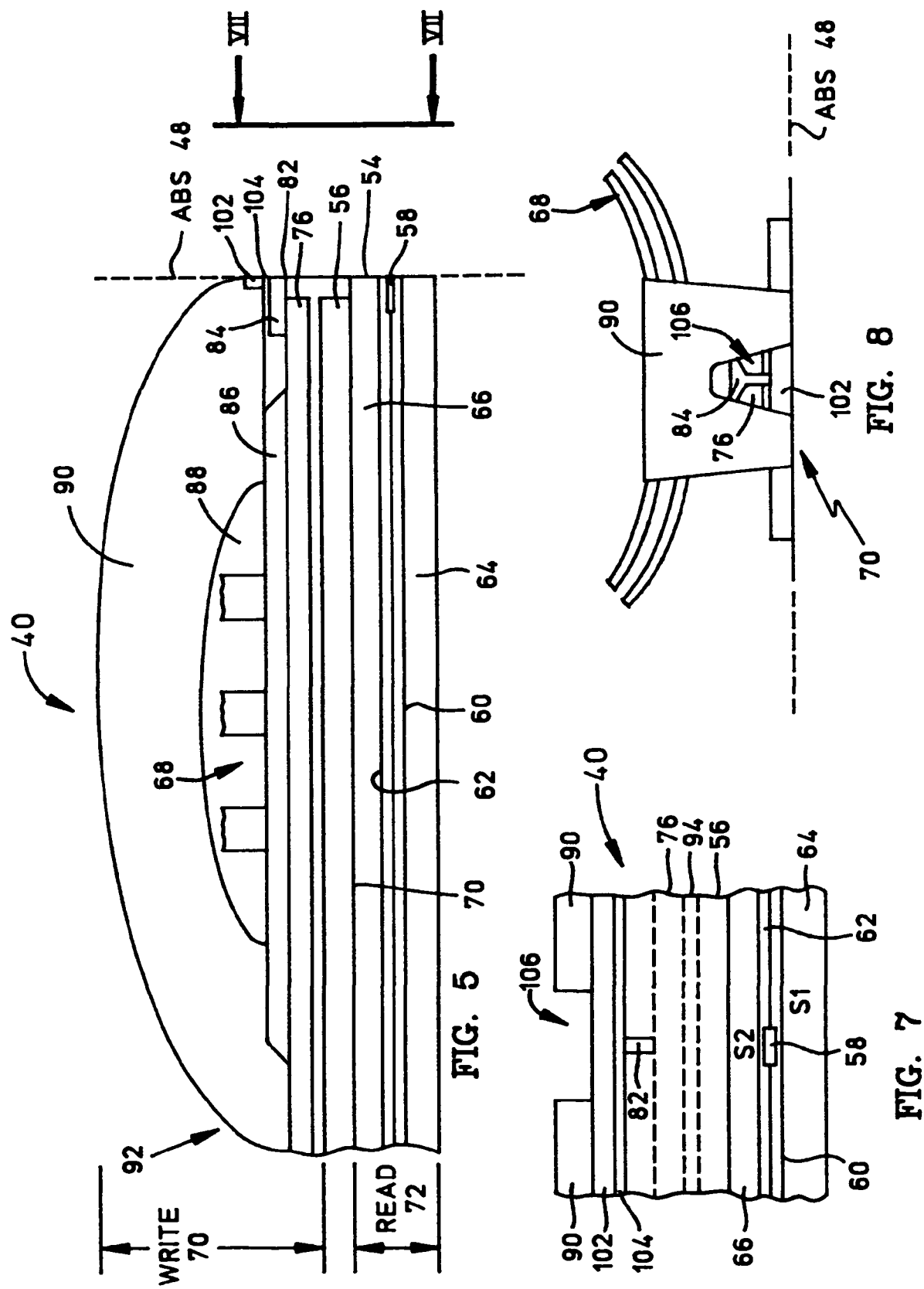

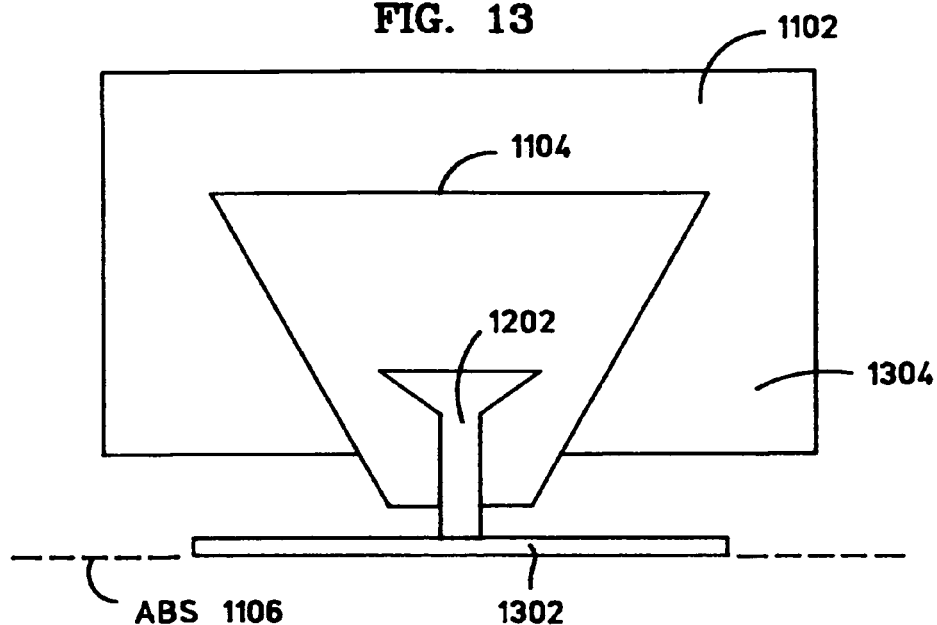
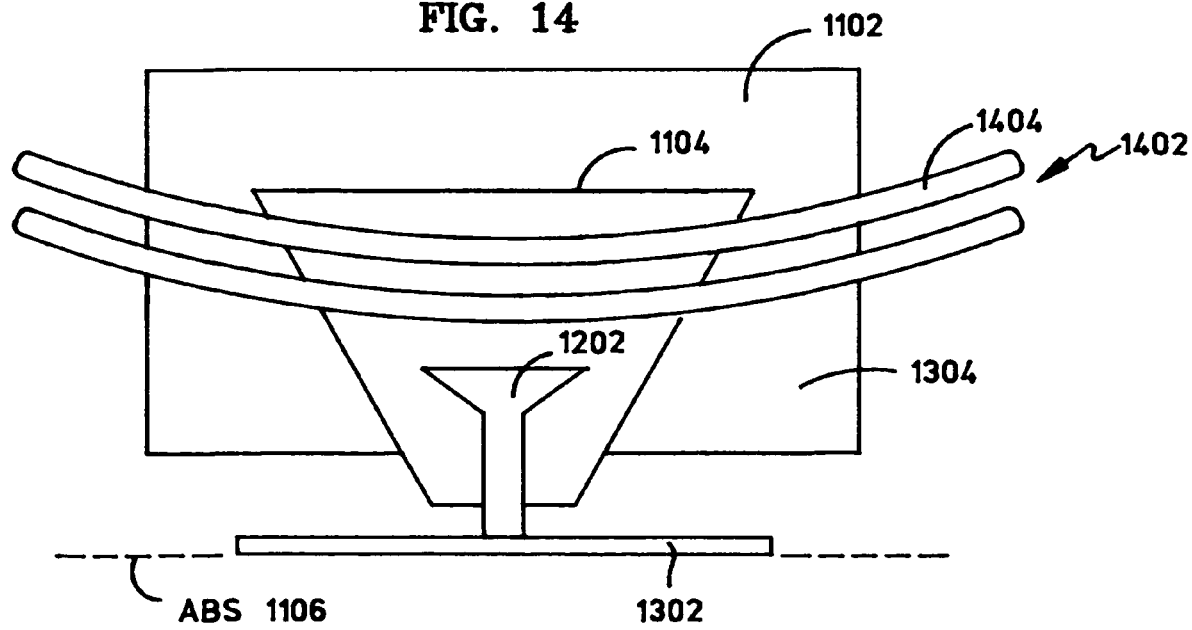

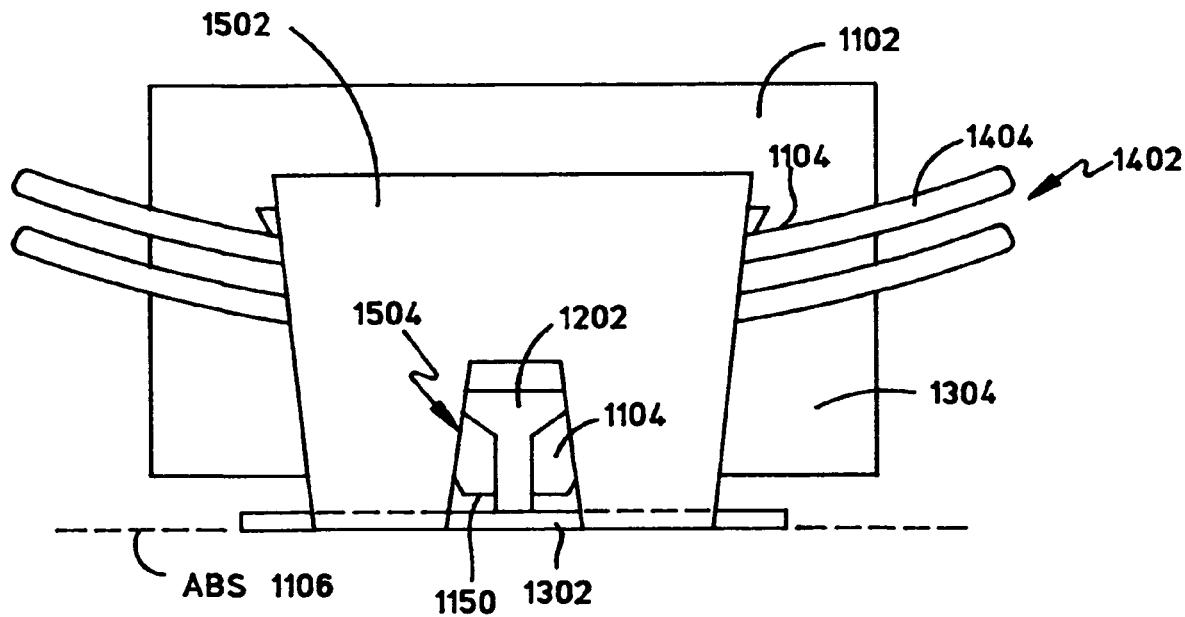

US 7,268,974 B2

MAGNETIC WRITE HEAD HAVING A NOTCHED YOKE STRUCTURE WITH A TRAILING SHIELD AND METHOD OF MAKING THE SAME

BACKGROUND OF THE INVENTION

1. Field of the Invention

This invention relates generally to magnetic heads in disk drives, and more particularly to magnetic write heads having yoke structures with notches formed directly adjacent pole tip structures.

2. Description of the Related Art

A write head is typically combined with a magnetoresistive (MR) read head to form a merged MR head, certain elements of which are exposed at an air bearing surface (ABS). Traditionally, a write head includes first and second pole pieces connected at a back gap behind the ABS. The first and second pole pieces have first and second pole tips, respectively, which are separated at the ABS by a non-magnetic write gap. An insulation stack, which comprises a plurality of insulation layers, is sandwiched between the first and second pole pieces, and write coil layers are embedded in the insulation stack. A processing circuit is connected to the write coil for conducting write current through it which, in turn, induces magnetic write fields in the first and second pole pieces. Magnetic write fields of the first and second pole tips fringe across the gap layer at the ABS. In a magnetic disk drive, a magnetic disk is rotated adjacent to and a short distance (fly height) from the ABS so that the write fields magnetize the disk along circular tracks. The written circular tracks then contain information in the form of magnetized segments with fields detectable by the MR read head.

Modern inductive write heads for writing on perpendicular media require a greater magnetic flux gradient to achieve higher areal density recording. This increased magnetic flux gradient is necessary in order to reduce the amount of side writing and adjacent track interference (ATI). This gradient may also affect the on-track linear density of bits on the perpendicular media. One type of write head which provides such an increased magnetic gradient includes a return yoke having a "trailing shield" located upstream from the pole tip. When making such a write head with a sub-micron dimension pole tip, it is important that no excessive amount of magnetic write flux at the pole tip be shunted away through the trailing shield and the return yoke. A major challenge in producing a write head with a trailing shield is to magnetically connect the trailing shield to the return yoke so as to limit the amount of magnetic write flux that can be drawn directly into the return yoke at the pole tip region.

Accordingly, what are needed are improved magnetic write heads with increased magnetic flux gradients and methods of making the same.

SUMMARY

A magnetic write head for a data storage device includes a pole piece layer; a pole tip structure formed over the pole piece layer; a trailing shield formed at least in part along an air bearing surface (ABS) of the magnetic head adjacent the pole tip structure; a non-magnetic gap layer formed between the trailing shield and the pole tip structure; a yoke structure formed over at least part of the trailing shield; and a notch formed in the yoke structure adjacent the pole tip structure. Advantageously, the notch reduces magnetic flux otherwise drawn by the yoke structure in a region directly adjacent the pole tip structure. A method of making this magnetic head is also described.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 5 is a partial elevation view of the slider and magnetic head as seen in plane V-V of FIG. 2;

FIG. 7 is a partial ABS view of the slider taken along plane VII-VII of FIG. 5 to show the read and write elements of the magnetic head, including a notched yoke structure and trailing shield of the write head;

FIG. 8 is a top down view of the write head showing the notched yoke structure and trailing shield over the pole tip structure;

FIG. 13 is the third in the series of five top-down views of FIGS. 11-15, which is the same as that shown in FIG. 12 except that a gap layer is formed over the pole tip structure and a trailing shield is formed to extend along at least a portion of an air bearing surface (ABS) of the magnetic head;

FIG. 14 is the fourth in the series of five top-down views of FIGS. 11-15, which is the same as that shown in FIG. 13 except that write coils are formed over the structure; and FIG. 15 is the last in the series of five top-down views of FIGS. 11-15, which is the same as that shown in FIG. 14 except that a yoke structure having a notch adjacent the pole tip structure is formed.

DETAILED DESCRIPTION OF THE PREFERRED EMBODIMENTS

A magnetic write head for a data storage device includes a pole piece layer; a pole tip structure formed over the pole piece layer; a trailing shield formed at least in part along an air bearing surface (ABS) of the magnetic head adjacent the pole tip structure; a non-magnetic gap layer formed between the trailing shield and the pole tip structure; a yoke structure formed over at least part of the trailing shield; and a notch formed in the yoke structure adjacent the pole tip structure. Advantageously, the notch reduces magnetic flux otherwise drawn by the yoke structure in a region directly adjacent the pole tip structure. A method of making the magnetic head is also described.

The following description is the best embodiment presently contemplated for carrying out the present invention. This description is made for the purpose of illustrating the general principles of the present invention and is not meant to limit the inventive concepts claimed herein.

Figure 1:
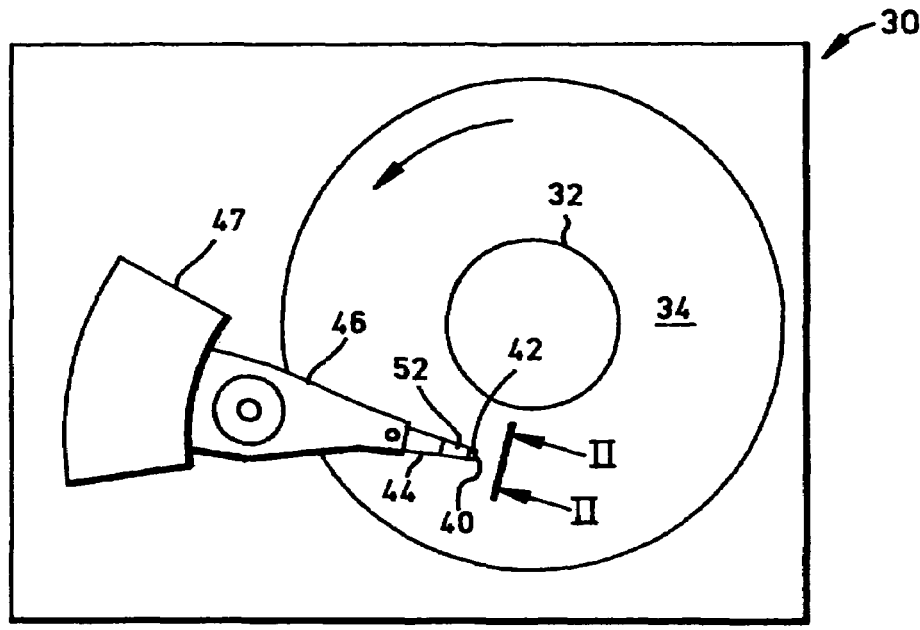
FIG. 1 is a planar view of an exemplary magnetic disk drive.
Figure 2:
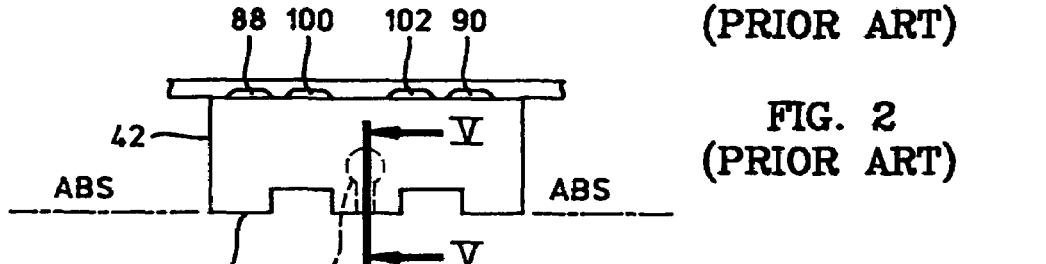
FIG. 2 is an end view of a slider with a magnetic head of the disk drive as seen in plane II-II.
Figure 3:
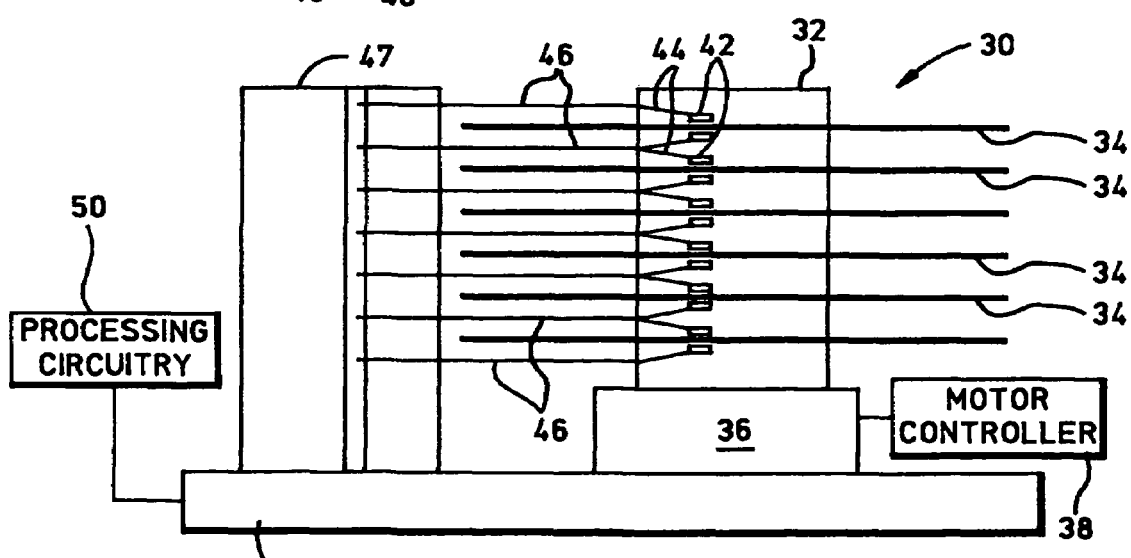
FIG. 3 is an elevation view of the magnetic disk drive wherein multiple disks and magnetic heads are employed.
Figure 4:
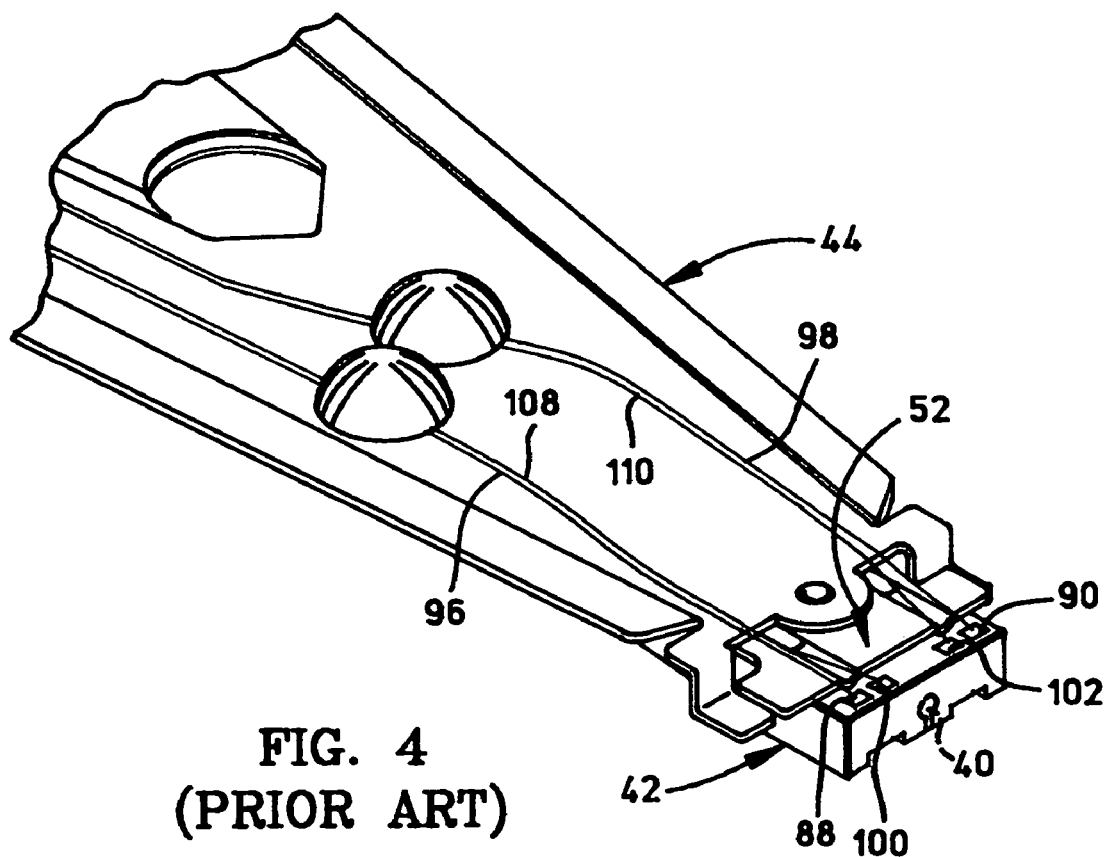
FIG. 4 is an isometric illustration of an exemplary suspension system for supporting the slider and magnetic head.

Referring now to the drawings wherein like reference numerals designate like or similar parts throughout the several views, FIGS. 1-3 illustrate a magnetic disk drive 30. Disk drive 30, which is one type of data storage device, includes a spindle 32 that supports and rotates a magnetic disk 34. Spindle 32 is rotated by a spindle motor 36 that is controlled by a motor controller 38. A slider 42 includes a combined read and write magnetic head 40 and is supported by a suspension 44 and actuator arm 46 that is rotatably positioned by an actuator 47. A plurality of disks, sliders, and suspensions may be employed in a large capacity direct access storage device (DASD) as shown in FIG. 3. Suspension 44 and actuator arm 46 are moved by actuator 47 to position slider 42 so that magnetic head 40 is in a transducing relationship with a surface of magnetic disk 34. When disk 34 is rotated by spindle motor 36, slider 42 is supported on a thin cushion of air (air bearing) between the surface of disk 34 and an air bearing surface (ABS) 48. Magnetic head 40 may then be employed for writing information to multiple circular tracks on the surface of disk 34, as well as for reading information therefrom. Processing circuitry 50 exchanges signals, representing such information, with head 40, provides spindle motor drive signals for rotating magnetic disk 34, and provides control signals to actuator 47 for moving slider 42 to various tracks. In FIG. 4, slider 42 is shown mounted to a suspension 44. The components described hereinabove may be mounted on a frame 54 of a housing which covers and contains them.

FIG. 5 is a side cross-sectional elevation view of a magnetic head 40, which includes a write head portion 70 and a read head portion 72. FIG. 7 is an ABS view of FIG. 5. Read head portion 72 includes a giant magnetoresistive (GMR) read head having a read sensor 58. Read sensor 58 is sandwiched between nonmagnetic electrically insulative first and second read gap layers 60 and 62, and read gap layers 60 and 62 are sandwiched between ferromagnetic first and second shield layers 64 and 66. In response to external magnetic fields, the resistance of read sensor 58 changes. A sense current $I_s$ conducted through the sensor causes these resistance changes to be manifested as potential changes. These potential changes are then processed as readback signals by processing circuitry 50 of FIG. 3. As shown in FIGS. 2 and 4, first and second solder connections 88 and 90 connect leads from read sensor 58 to leads 96 and 98 on suspension 44, and third and fourth solder connections 100 and 102 connect leads 104 and 106 from write coils 68 (see FIG. 6) to leads 108 and 110 on suspension 44. However, the number and locations of the above-mentioned connections may vary.

Figure 6:
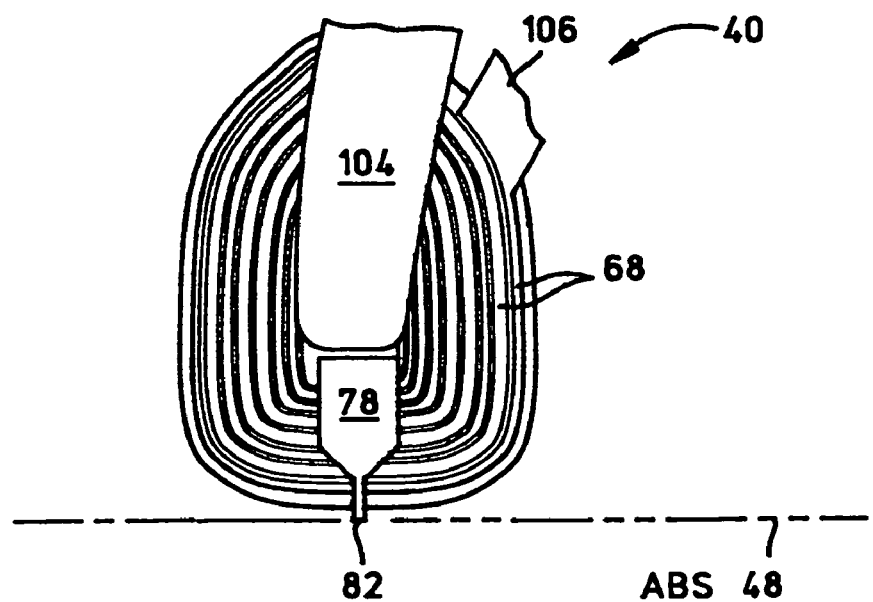
FIG. 6 is a top view of the second pole piece and coil layer, a portion of which is shown in FIG. 5, with all insulation material removed.
Figure 9:
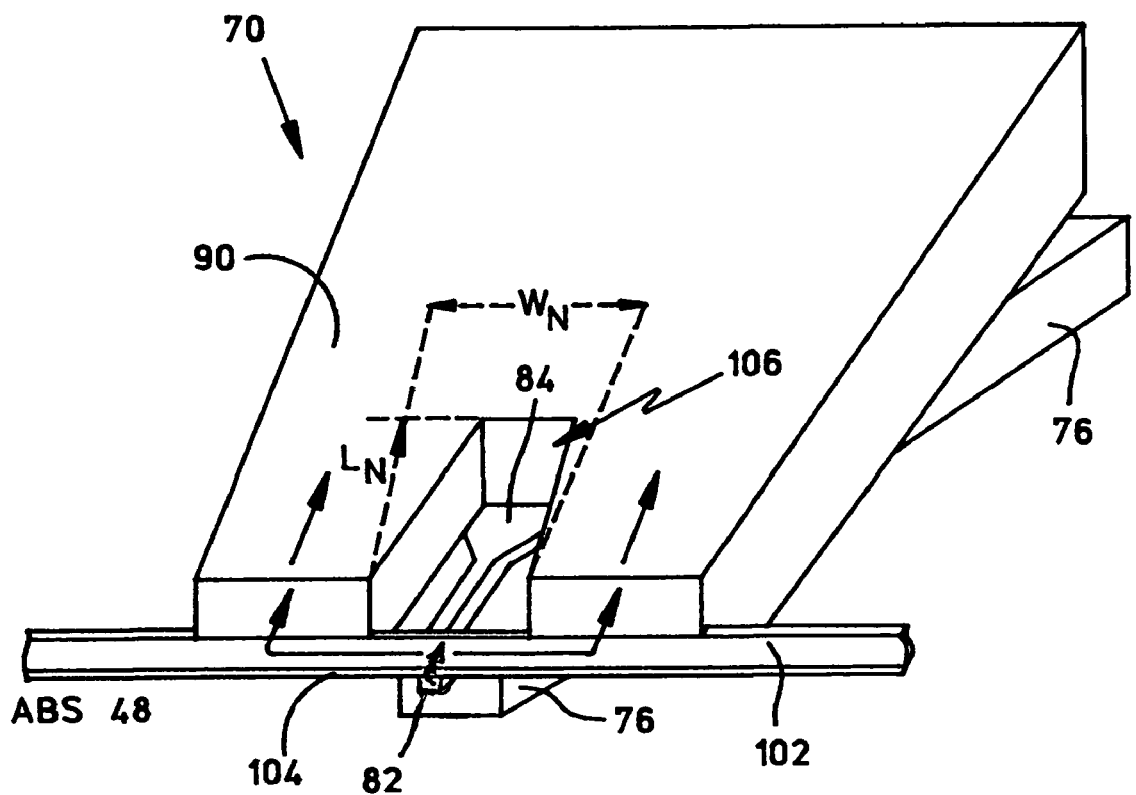
FIG. 9 is a perspective view of the write head showing the notched yoke structure and trailing shield over the pole tip structure.

Primary components of write head portion 70 of magnetic head 40 are depicted in top down and perspective views in FIGS. 8-9, respectively, in addition to the illustrations of FIGS. 5-7. Write head portion 70 includes write coils 68, a pole piece layer 76, a pole tip structure 82, a trailing shield 102, a non-magnetic write gap layer 104, and a yoke structure 90. Write coils 68 are sandwiched between insulation materials 86 and 88, which are in turn sandwiched between pole piece layer 76 and yoke structure 90 (FIGS. 5 and 8). Pole piece layer 76, pole tip structure 84, trailing shield 102, and yoke structure 90 are made primarily of magnetic materials such as nickel-iron (NiFe), cobalt-iron (CoFe), or alloys thereof. Pole piece layer 76 is formed over a thin isolation layer 94 made of non-magnetic materials, which are formed over a non-magnetic spacer layer 56 (FIG. 5). Pole piece layer 76, which may be referred to as a shaping layer, has a front edge that is recessed away from ABS 48 (FIGS. 5, 8, and 9). Pole tip structure 84 is formed over pole piece layer 76 and includes a pole tip 82 at the ABS 48. Preferably, pole tip structure 84 is made of a laminated structure of alternating layers of magnetic and non-magnetic materials. Note that the relative location of coil 68, pole piece layer 76, and yoke structure 90 may vary. In addition, yoke structure 90 may not necessarily directly connect to the back gap of write head portion 70.

Pole piece layer 76 is in contact with and magnetically coupled to yoke structure 90 in a back gap region 92 (FIG. 5). Yoke structure 90 is also in contact with and magnetically coupled to trailing shield 102 at ABS 48. In general, trailing shield 102 is a thin planar structure which extends at least along a portion of ABS 48 above where pole tip structure 84 is located. In this embodiment, trailing shield 102 extends along a relatively large portion of ABS 48 and is generally formed as a thin rectangular structure (FIG. 8). Pole tip structure 84 is separated from trailing shield 102 at the ABS 48 by write gap layer 104. Together, yoke structure 90 and trailing shield 102 may be referred to as a "return pole" or "return yoke" for the magnetic head.

Notably, yoke structure 90 is formed with a notch 106 at ABS 48 as shown in FIGS. 7-9. Notch 106 is specifically formed adjacent and above pole tip structure 84. Thus, yoke structure 90 is in contact with and magnetically coupled to trailing shield 102 along ABS 48 except where notch 106 is formed. No magnetic materials exist above that portion of trailing shield 102 under which pole tip structure 84 is located, as insulator materials (not shown) are formed within notch 106. As illustrated in FIGS. 8-9, notch 106 is formed to have a U-shape, V-shape, or trapezoidal shape as viewed from the top down. Also, yoke structure 90 with notch 106 and trailing shield 102 together form a U-shape as viewed from ABS 48 (FIG. 7). Other shapes may be suitable as well.

The general flow of magnetic write flux through the write head portion 70 will now be described in relation to FIG. 9. During operation, magnetic write flux is produced which travels through pole piece layer 76 toward the ABS 48 to pole tip structure 84, where it reaches pole tip 82. From pole tip 82, the magnetic write flux may escape directly into the adjacent perpendicular recording media (not shown in FIG. 9) or across write gap layer 104 into trailing shield 102 directly adjacent pole tip 82 (see magnetic flux arrow in FIG. 9). Since notch 106 is formed directly above this portion of trailing shield 102, the magnetic write flux must travel along the length of trailing shield 102 in both left and right directions to reach and be returned through yoke structure 90 (see magnetic flux arrows in FIG. 9). Little if any magnetic write flux can escape directly through yoke structure 90 in the region directly above pole tip 82. This general structure which includes trailing shield 102 provides for an increased magnetic field gradient for writing to perpendicular recording media, where notch 106 reduces magnetic write flux otherwise drawn by yoke structure 90 in the region directly adjacent pole tip 82.

Figure 10:
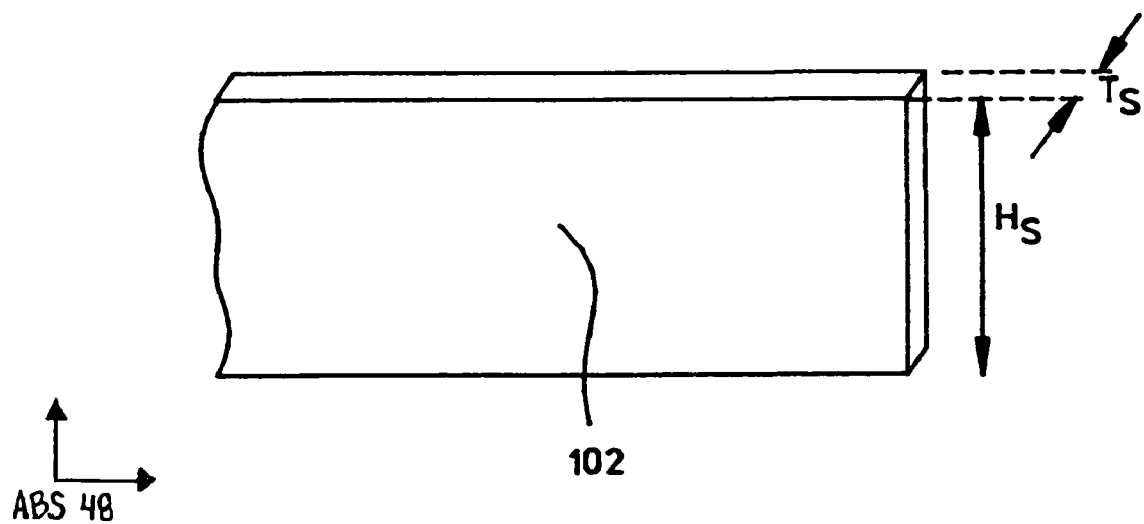
FIG. 10 is a close-up view of a portion of the trailing shield from FIG. 9.

In the present embodiment, notch 106 of yoke structure 90 has a width $W_N$ (FIG. 9) of about 2 micrometers (μm) and a length $L_N$ (FIG. 9) of about 5 μm. More generally, the width $W_N$ may be within the range of 0.5-20 µm and the length $L_N$ may be within the range of 0.5-20 µm. Note that it is preferred that the length $L_N$ and width $W_N$ of notch 106 be sufficient to expose a majority of the top of pole tip structure 84, including a back flared end of pole tip structure 84 (FIGS. 8-9). The thickness of yoke structure 90 may be within the range of about 0.3 µm and 3 µm. Also in this embodiment, trailing shield 102 has a height $H_S$ (FIG. 10) of about 0.3 µm and a thickness $T_S$ (FIG. 10) of about 0.05 µm relative to ABS plane 48. More generally, the height $H_S$ of trailing shield 102 may be at least four times the thickness $T_S$. Pole tip structure 82 provides for a magnetic track width of about 0.08 µm, but more generally may provide a magnetic track width within the range of about 0.01-0.1 µm.

Figure 11:
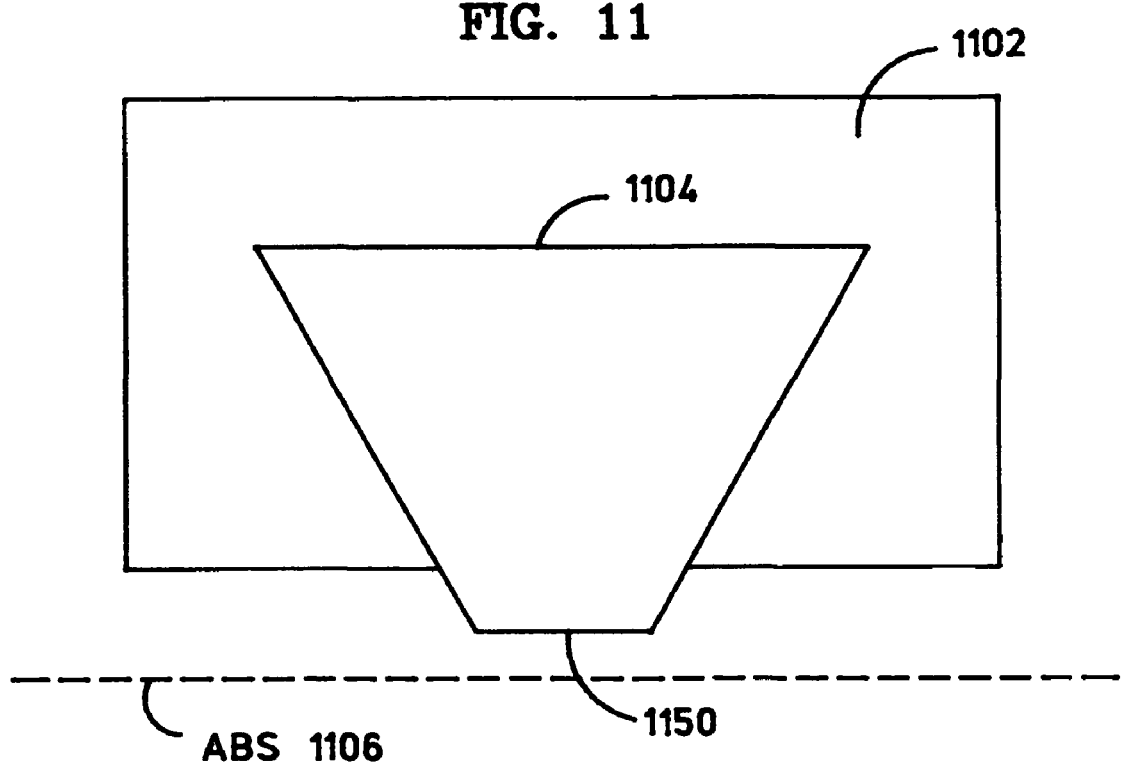
FIG. 11 is the first in a series of five top down views of FIGS. 11-15 for describing a method of making a magnetic write head having a notched yoke structure, where a pole piece layer is formed over an insulator layer.

FIG. 11 is the first in a series of five top down views of FIGS. 11-15 for describing a method of making a magnetic write head having a notched yoke structure and a trailing shield. The resulting magnetic write head may be that shown and described in relation to FIGS. 1-10 above or variations thereof. In FIG. 11, a magnetic pole piece layer 1104 is formed over a non-magnetic insulator layer 1102. Layer 1102 itself is formed over a substrate such as a heat sink or other component of the magnetic head. Pole piece layer 1104 is generally made from magnetic materials such as nickel-iron (NiFe), cobalt-iron (CoFe), or alloys thereof. Preferably, pole piece layer 1104 is formed by electroplating magnetic materials over insulator layer 1102 after the deposition of a suitable seed layer (not shown in FIG. 11). Pole piece layer 1104 may be formed to have a thickness of anywhere between about 0.5 µm and 8 µm. In this particular embodiment, pole piece layer 1104 is formed to generally have a four-sided polygon shape as depicted. Preferably, pole piece layer 1104 is formed to have a front edge 1150 that is recessed behind an air bearing surface (ABS) 1106 of the magnetic head. Preferably, front edge 1150 of pole piece layer 1104 is recessed anywhere between about 0.5 µm and 2 µm from ABS 1106. ABS 1106, which is depicted by a dashed line in FIG. 11, is defined in later processing steps.

Figure 12:
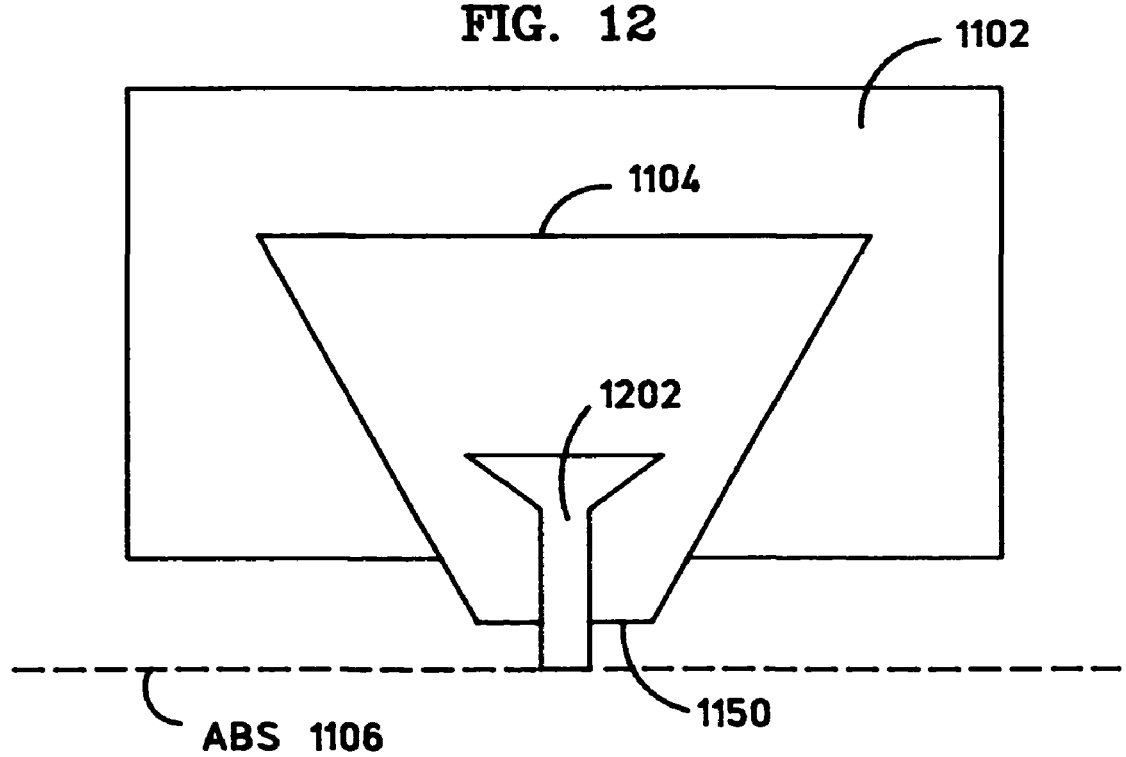
FIG. 12 is the second in the series of five top-down views of FIGS. 11-15, which is the same as that shown in FIG. 11 except that a pole tip structure is formed over the pole piece layer.

Next in FIG. 12, a pole tip structure 1202 is formed over pole piece layer 1104. Pole tip structure 1202 is generally made from magnetic materials such as nickel-iron (NiFe), cobalt-iron (CoFe), or alloys thereof. Pole tip structure 1202 may be formed to have a thickness of between about 40 nanometers (nm) and 200 nm, and has a shape that is generally much narrower than pole piece layer 1104 as illustrated. As shown, a rear end of pole tip structure 1202 is formed over a middle section of pole piece layer 1104 and extends beyond a front end of pole tip structure 1202 through ABS 1106. The front end of pole tip structure 1202 will be cut and lapped along ABS 1106 during later processing steps which define ABS 1106. Pole tip structure 1202 may be formed by electroplating magnetic materials over pole piece layer 1104. If pole tip structure 1202 is formed as a laminated structure of alternating layers of magnetic and non-magnetic materials, the layers are deposited in full-film in an alternating fashion where portions are etched away to form the desired shape with a suitably-formed mask.

Next in FIG. 13, a non-magnetic write gap layer 1304 is deposited over the structure so as to at least cover pole tip structure 1202 along ABS 1106. Gap layer 1304 may be any suitable non-magnetic material such as alumina or the like. Gap layer 1304 is formed to a thickness of less than 100 nm. Next, a trailing shield 1302 which extends over gap layer 1304 at least partially along ABS 1106 is formed. Preferably, trailing shield 1302 is formed by electroplating magnetic materials (such as nickel-iron) over gap layer 1304 after the deposition of a suitable seed layer (not shown in FIG. 13). No physical contact is made with pole tip structure 1202. In this embodiment, trailing shield 1302 extends along a relatively large portion of ABS 1106 and is generally formed as a thin rectangular structure.

In FIG. 14, write coils 1402 (such as a write coil 1404) are formed over the structure. Insulator materials are deposited prior to and after the formation of write coils 1402 to provide appropriate isolation from pole materials and subsequently formed yoke materials. In FIG. 15, a yoke structure 1502 is then formed over the insulator materials. Yoke structure 1502 is formed to generally cover many write head components such as pole piece layer 1104. Yoke structure 1502 is made from magnetic materials such as nickel-iron (NiFe), cobalt-iron (CoFe), or alloys thereof. Yoke structure 1502 may be formed to have a thickness of between about 0.5 µm and 8 µm. Together, yoke structure 1502 and trailing shield 1302 may be referred to as a "return pole" or "return yoke" for the magnetic head. Preferably, yoke structure 1502 is formed by electroplating magnetic materials (such as nickel-iron) over the insulator materials after the deposition of a suitable seed layer (not shown in FIG. 15).

Notably, yoke structure 1502 of FIG. 15 is formed with a notch 1504. Notch 1504 is specifically formed adjacent and above pole tip structure 1202 at least at ABS 1106. Thus, yoke structure 1502 is in contact with and magnetically coupled to trailing shield 1302 along ABS 1106 except where notch 1504 is formed. Put another way, yoke structure 1502 is magnetically "stitched" to trailing shield 1302 without excess magnetic materials provided directly adjacent the pole tip. No magnetic materials exist above that portion of trailing shield 1302 under which pole tip structure 1202 is located. Non-magnetic materials (not shown), such as insulator or other suitable materials, are subsequently deposited and formed within notch 1504. Thus, little if any magnetic write flux can escape directly through yoke structure 1502 in the region directly above the pole tip. As illustrated, notch 1504 is formed to have a U-shape, V-shape, or trapezoidal shape as viewed from the top down. Also, yoke structure 1502 with notch 1504 and trailing shield 1302 together form a U-shape as viewed from ABS 1106. Other shapes may be suitable as alternatives.

Advantageously, the write head formed as described in relation to FIGS. 11-15 provides for an increased magnetic field gradient for writing to perpendicular recording media, where notch 1504 reduces magnetic write flux otherwise drawn by yoke structure 1502 in a region directly adjacent pole tip structure 1202.

A magnetic head having a notched yoke structure and a method of making the same have been described. The magnetic head for a data storage device includes a pole piece layer; a pole tip structure formed over the pole piece layer; a trailing shield formed at least in part along an air bearing surface (ABS) plane of the magnetic head adjacent the pole tip structure; a non-magnetic gap layer formed between the trailing shield and the pole tip structure; a yoke structure formed over at least part of the trailing shield; and a notch formed in the yoke structure adjacent the pole tip structure. Advantageously, the notch reduces magnetic flux otherwise drawn by the yoke structure in a region directly adjacent the pole tip structure. A data storage device such as a disk drive which may embody such a magnetic head includes a housing; a magnetic disk rotatably supported in the housing; a support mounted in the housing for supporting the magnetic head so as to be in a transducing relationship with the magnetic disk; a spindle motor for rotating the magnetic disk; an actuator positioning means connected to the support for moving the magnetic head to multiple positions with respect to said magnetic disk; and a processor connected to the magnetic head assembly, to the spindle motor, and to the actuator for exchanging signals with the magnetic head for controlling movement of the magnetic disk and for controlling the position of the magnetic head. A method of making such a magnetic head may include forming a pole tip structure over at least a portion of a pole piece layer; forming a non-magnetic gap layer over at least a portion of the pole tip structure at an air bearing surface (ABS); forming a trailing shield over the non-magnetic gap layer at least along the ABS; and forming, over a portion of the trailing shield, a yoke structure having a notch formed adjacent the pole tip structure.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special particular meaning different from their plain language meaning, and therefore the specification is not to be used to define terms in an unduly narrow sense.

What is claimed is:

1. A magnetic head, comprising:
a pole piece layer;
a pole tip structure formed over the pole piece layer;
a trailing shield formed at least in part along an air bearing surface (ABS) of the magnetic head adjacent the pole tip structure;
a gap layer formed between the trailing shield and the pole tip structure;
a yoke structure;
a notch in the yoke structure which provides a separation of the yoke structure into a first yoke portion and a second yoke portion; and
the first yoke portion and the second yoke portion magnetically connecting the yoke structure to the trailing shield and flanking the pole tip structure such that the notch is adjacent the pole tip structure.

2. The magnetic head of claim 1, wherein the notch comprises one of a U-shape, a trapezoidal shape, and a V-shape.

3. The magnetic head of claim 1, wherein the trailing shield, the yoke structure, and the notch form a U-shape along an ABS plane.

4. The magnetic head of claim 1, wherein the notch reduces magnetic flux otherwise drawn by the yoke structure in a region directly adjacent the pole tip structure.

5. The magnetic head of claim 1, further comprising:
the trailing shield having a thickness defined in directions normal an ABS plane;
the trailing shield having a height defined in directions perpendicular to the thickness; and
the height of the trailing shield being at least four times the thickness.

6. The magnetic head of claim 1, further comprising:
an edge of the pole piece layer being recessed from the ABS.

7. The magnetic head of claim 1, wherein the pole piece layer, the pole tip structure, and the yoke structure comprise magnetic materials.

8. The magnetic head of claim 1, further comprising:
write coils formed between the pole piece layer and the yoke structure.

9. The magnetic head of claim 1, further comprising:
non-magnetic materials formed within the notch.

10. A disk drive, comprising:
a housing;
a magnetic disk rotatably supported in the housing;
a magnetic head;
a support mounted in the housing for supporting the magnetic head so as to be in a transducing relationship with the magnetic disk;
a spindle motor for rotating the magnetic disk;
an actuator connected to the support for moving the magnetic head to multiple positions with respect to said magnetic disk;
a processing circuit connected to the magnetic head, to the spindle motor, and to the actuator for exchanging signals with the magnetic head for controlling movement of the magnetic disk and for controlling the position of the magnetic head;
the magnetic head including:
a pole piece layer;
a pole tip structure formed adjacent the pole piece layer;
a trailing shield formed at least in part along an air bearing surface (ABS) plane of the magnetic head adjacent the pole tip structure;
a gap layer formed between the trailing shield and the pole tip structure;
a yoke structure;
a notch in the yoke structure which provides a separation of the yoke structure into a first yoke portion and a second yoke portion; and
the first yoke portion and the second yoke portion magnetically connecting the yoke structure to the trailing shield and flanking the pole tip structure such that the notch is adjacent the pole tip structure.

11. The disk drive of claim 10, wherein the notch comprises one of a U-shape, a trapezoidal shape, and a V-shape.

12. The disk drive of claim 10, wherein the trailing shield, the yoke structure, and the notch form a U-shape along an ABS plane.

13. The disk drive of claim 10, wherein the notch reduces magnetic flux otherwise drawn by the yoke structure in a region directly adjacent the pole tip structure.

14. The disk drive of claim 10, further comprising:
the trailing shield having a thickness defined in directions normal the ABS plane;
the trailing shield having a height defined in directions perpendicular the thickness; and
the height of the trailing shield being at least four times the thickness.

15. The disk drive of claim 10, further comprising:
an edge of the pole piece layer being recessed from the ABS plane.

16. The disk drive of claim 10, wherein the pole piece layer, the pole tip structure, and the yoke structure comprise magnetic materials.

17. The disk drive of claim 10, further comprising:
write coils formed between the pole piece layer and the yoke structure.

18. The disk drive of claim 10, further comprising:
non-magnetic materials formed within the notch.

19. A method of making a magnetic head, comprising:
forming a pole tip structure over at least a portion of a pole piece layer;
forming a non-magnetic gap layer over at least a portion of the pole tip structure at an air bearing surface (ABS);
forming a trailing shield over the non-magnetic gap layer at least along the ABS; and forming a yoke structure having a notch which provides a separation of the yoke structure into a first yoke portion and a second yoke portion, the first yoke portion and the second yoke portion magnetically connecting the yoke structure to the trailing shield and flanking the pole tip structure such that the notch is adjacent the pole tip structure.

20. The method of claim 19, wherein the act of forming the yoke structure comprises the further act of forming the notch having one of a U-shape, a trapezoidal shape, and a V-shape.

21. The method of claim 19, wherein the act of forming the yoke structure comprises the further act of forming the notch such that the trailing shield, the yoke structure, and the notch form a U-shape along an ABS plane.

22. The method of claim 19, further comprising:
wherein the trailing shield has a thickness defined in directions normal an ABS plane;
wherein the trailing shield has a height defined in directions perpendicular the thickness; and
wherein the height of the trailing shield is at least four times the thickness.

23. The method of claim 19, wherein the act of forming the pole piece layer comprises forming an edge of the pole piece layer recessed from the ABS.

24. The method of claim 19, wherein the notch reduces magnetic write flux otherwise drawn by the yoke structure in a region directly adjacent the pole tip structure.

25. The method of claim 19, wherein the pole piece layer, the pole tip structure, and the yoke structure comprise magnetic materials.

26. The method of claim 19, further comprising:
forming write coils between the pole piece layer and the yoke structure.

27. The method of claim 19, further comprising:
forming non-magnetic materials within the notch.

28. The method of claim 19, wherein the act of forming the yoke structure comprises the further act of electroplating to form the yoke structure.

29. The method of claim 19, wherein the act of forming the trailing shield comprises the further act of electroplating to form the trailing shield.

30. The method of claim 19, wherein the act of forming the pole tip structure comprises the act of forming alternating layers of magnetic and non-magnetic materials.

* * * * *